US011537569B2

(12) United States Patent
Agrawal et al.

(10) Patent No.: US 11,537,569 B2
(45) Date of Patent: Dec. 27, 2022

(54) MERGES USING KEY RANGE DATA STRUCTURES

(71) Applicant: salesforce.com, inc., San Francisco, CA (US)

(72) Inventors: Rohit Agrawal, San Francisco, CA (US); Aditya Shetty, San Francisco, CA (US); Kaushal Mittal, Dublin, CA (US); Terry Chong, Pleasanton, CA (US); Thomas Fanghaenel, Oakland, CA (US); Vaibhav Arora, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 184 days.

(21) Appl. No.: 17/009,605

(22) Filed: Sep. 1, 2020

(65) Prior Publication Data

US 2022/0067004 A1 Mar. 3, 2022

(51) Int. Cl.
*G06F 16/22* (2019.01)
*G06F 16/21* (2019.01)
*G06F 21/62* (2013.01)

(52) U.S. Cl.
CPC ........ *G06F 16/214* (2019.01); *G06F 16/2246* (2019.01); *G06F 21/6227* (2013.01)

(58) Field of Classification Search
CPC .............. G06F 16/214; G06F 16/2246; G06F 16/6227; G06F 21/6227
See application file for complete search history.

(56) References Cited

U.S. PATENT DOCUMENTS

| 6,208,993 | B1 * | 3/2001 | Shadmon ................ G06F 16/30 |
| | | | 707/999.102 |
| 9,311,252 | B2 | 4/2016 | Fong et al. |
| 2014/0195492 | A1 | 7/2014 | Wilding |
| 2016/0179865 | A1 | 6/2016 | Bortnikov et al. |
| 2017/0199818 | A1 | 7/2017 | Lomet et al. |
| 2019/0236156 | A1 * | 8/2019 | Fanghaenel ......... G06F 12/0891 |
| 2020/0201821 | A1 * | 6/2020 | Wang ...................... G06F 16/13 |
| 2020/0201822 | A1 * | 6/2020 | Wang .................. G06F 16/1873 |
| 2022/0092083 | A1 * | 3/2022 | Grimaldi ............... G06F 16/273 |

* cited by examiner

*Primary Examiner* — James E Richardson
(74) *Attorney, Agent, or Firm* — Kowert, Hood, Munyon, Rankin & Goetzel, P.C.; Mark D. Seegers; Dean M. Munyon

(57) ABSTRACT

Techniques are disclosed relating to merge operations for multi-level data structures, such as log-structured merge-trees (LSM trees). A computer system may store, in a database, a plurality of files as part of an LSM tree and a plurality of database key structures. A given one of the plurality of database key structures may indicate, for a corresponding one of the plurality of files, a set of key ranges derived from database records that are included in the corresponding file. The computer system may determine, using ones of the plurality of database key structures, a key range overlap that is indicative of an extent of overlap of key ranges from a set of the plurality of files with respect to a particular key range. Based on the determined key range overlap, the computer system may assign a priority level to a merge operation that involves the set of files.

18 Claims, 9 Drawing Sheets

MERGES USING KEY RANGE DATA STRUCTURES

BACKGROUND

Technical Field

This disclosure relates generally to database systems and, more specifically, to the use of trie data structures in log-structured merge-tree (LSM tree) related operations.

Description of the Related Art

Modern database systems routinely implement management systems that enable users to store a collection of information in an organized manner that can be efficiently accessed and manipulated. In some cases, these management systems maintain a log-structured merge-tree (LSM tree) having multiple levels that each store information in database records as key-value pairs. An LSM tree normally includes two high-level components: an in-memory buffer and a persistent storage. In operation, a database system initially writes database records into the in-memory buffer before later flushing them to the persistent storage. As part of flushing database records, the database system writes the database records into new files that are included in one of the many levels of the LSM tree. Over time, the database records are rewritten into new files included in lower levels as the database records are shifted down the LSM tree.

Figure 1:
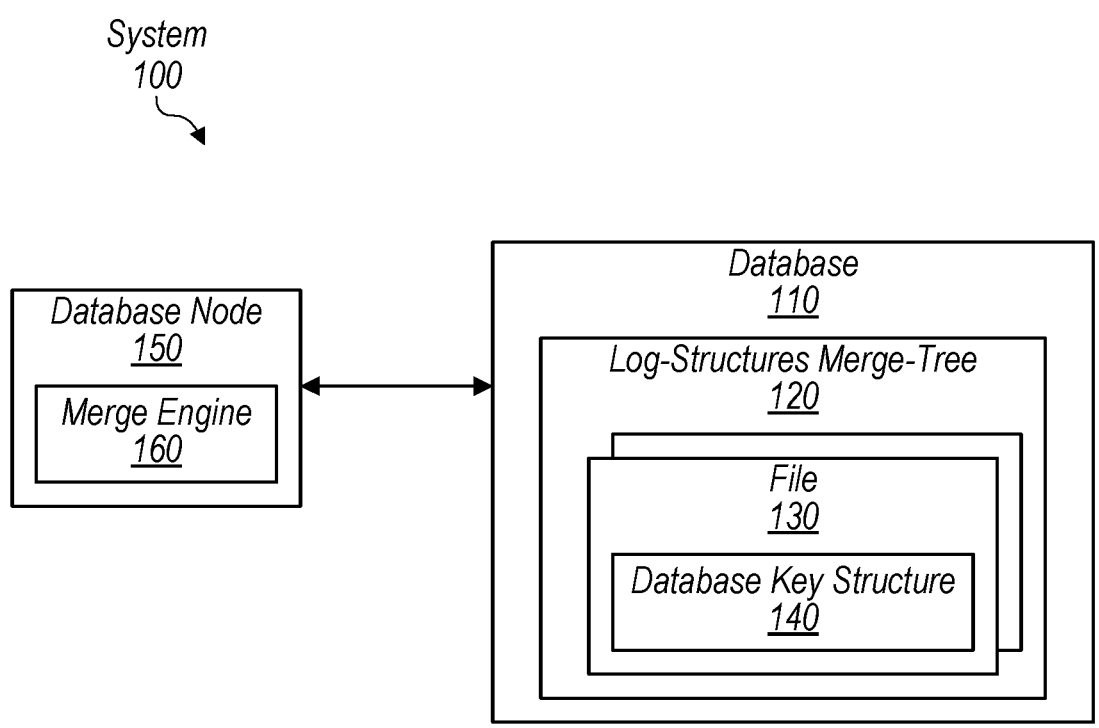
FIG. 1 is a block diagram illustrating example elements of a database system, according to some embodiments.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "network interface configured to communicate over a network" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus, the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, in a processor having eight processing cores, the terms "first" and "second" processing cores can be used to refer to any two of the eight processing cores. In other words, the first and second processing cores are not limited to processing cores 0 and 1, for example.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

DETAILED DESCRIPTION

As mentioned, modern database systems often operate a database that is built around a multi-level LSM tree. During operation, database records are initially written into files that are included in the "top" level of the LSM tree. Over time, those database records are pushed down the levels of the LSM tree by being rewritten into new files included in the next level. When database records are being rewritten into a new file included in the next level, they are normally written into the new file along with other database records that are already present in the next level. This process is referred to as "merging" as the database records of the source/input level are merged with database records of the next level into the same new file.

In some implementations, the database system performs a merge of database records from two different files into a new file if there is any key range overlap between key ranges of those two files. In particular, a file is associated with a key range that is defined by the keys of the database records that are included in that file. Accordingly, the database system determines if there is key range overlap by comparing the minimum and maximum keys of the key ranges of two files. If the key ranges share any overlap (e.g., the value of the minimum key of one key range is between the values of the minimum and maximum keys of the second key range), then the database system merges database records from the two files into a new file.

While some database systems are able to make the determination that two key ranges overlap, these implementations do not provide a mechanism for quantifying the overlap. This can lead to merges with undesirable write amplification in which a merge is performed with two files that share very little overlap in a key range. For example, if two files share an overlap in their key ranges but the overlap is relatively small and the file in the target level contributes more records to the new file, then the database system will mostly be rewriting the file that is already in the target level without adding many records from the file of the source level. (This is referred to herein as an "output-dominated" merge operation as the output/target level contributes most of the records to the new file in the target level. This stands in contrast to an "input-dominated" merge operation in which the input level contributes most of the records to the new file in the target level.) As a result, the system wastes resources moving only a few records from the input level into the next level of the LSM tree. The present disclosure addresses at least this technical problem of performing merge operations that are not efficient and have reasonably high write amplification.

The present disclosure describes various techniques for quantifying an overlap between the key ranges of a set of files with respect to a merge key range and assigning a priority to the corresponding merge operation based on the quantified overlap. The present disclosure further describes techniques for performing a multi-level merge operation in which database records are copied from multiple levels into a target level that is several levels down in an LSM tree—this stands in contrast to implementations that perform merges between only two levels at a given time. As used herein, the term "multi-level merge operation" refers to a merge operation involving at least three levels of the LSM tree. The present disclosure also describes techniques for performing more efficient key range lookups using database key structures (e.g., tries).

In various embodiments that are described below, a system stores, as part of an LSM tree implemented in a database, files that include database key structures and database records having data and corresponding database keys. The database key structure of a file may indicate, for a selected key range, an approximate number of keys (and thus database records) associated with the file that fall within the key range. As used herein, the general phrase "a key falls within a key range" refers to the character value of the key being lexicographically between or equal to the character values of the minimum and maximum keys of the key range. For example, the key "MAP" falls within the key range APP→TOP. In various embodiments, the database key structure is a trie. As used herein, the term "trie" is used in accordance with its established meaning and refers to a tree-like data structure whose branches are made of linked nodes that correspond to character values. As such, a branch of a trie can represent a database key where the individual nodes of that branch correspond to the individual characters of the key. When assessing overlap, the system may count the number of branches whose represented key falls within the merge key range. Based on the number of branches, in various embodiments, the system determines an overlap of the corresponding file with respect to the merge key range. The system may then assign a priority level to a merge operation involving that file based on the overlap.

In various cases, database records from a file of an input level and a file of a target level may be merged and the merge key range may correspond to the key range of one of those files (e.g., the file from the input level). Accordingly, the system may determine an overlap of the other file (e.g., the file from the target level) with respect to the merge key range determined by the former file. Based on the key range overlap of the latter file with respect to the former file, the system may assign a priority level to a merge operation involving those files. In various embodiments, the system prioritizes merge operations in which the files share a reasonable key overlap over merge operations in which the files do not.

In various embodiments, the system can perform multi-level merge operations. In some cases, if the number of records that are contributed by a file in a first level and a file in a second level does not satisfy a set of criteria (e.g., a max file size has not been met), then the system may consider merging records from files of additional levels of the LSM tree. As an example, the system may merge records from a file in a third level whose keys fall within the merge key range. In some embodiments, the system considers additional, subsequent levels for the merge operation until the set of criteria are satisfied—e.g., until the system has identified a threshold number of records to write to a new file in the target level. As a result, the system may perform merge operations that involves files from more than only two levels of the LSM tree.

These techniques may be advantageous over prior approaches as these techniques allow for the identification of less beneficial merge operations so that those merge operations can be delayed in view of higher priority merge operations or otherwise remedied. As explained, some merge operations are output-dominated in which the target level contributes most of the records to the new file in the target level. By being able to determine the overlap of a set of files with respect to a merge key range (and, as a result, the number of records contributed by each file), the system can determine whether a merge operation is output-dominated. As such, the system can delay or skip those merge operations that are identified as output-dominated, avoiding high write amplification issues that result from basically rewriting a file that already exists within the target level. Also as explained, some merge operations are input-dominated in which the "highest" level of the merge contributes most of the records to the new file written to the target level. By being able to determine the overlap of a set of files with respect to a merge key range, the system can determine that a merge operation is input-dominated. The system can then look at the overlap of files with respect to the merge key range that are from subsequent levels down that have not been assessed in order to change the merge operation from being input-dominated as the highest level contributes less as a percentage as more files contribute. These techniques also enable a system to perform a merge operation involving more than only two levels of the LSM tree as was previously done. An exemplary application of these techniques will now be discussed, starting with reference to FIG. 1.

Turning now to FIG. 1, a block diagram of a system 100 is shown. System 100 includes a set of components that may be implemented via hardware or a combination of hardware and software routines. In the illustrated embodiment, system 100 includes a database 110 and a database node 150 that interacts with database 110. As further shown, database 110 includes a log-structured merge-tree (LSM tree) 120 having files 130 with corresponding database key structures 140. Also as illustrated, database node 150 includes a merge engine 160. In some embodiments, system 100 may be implemented differently than shown. For example, database key structures 140 may be stored separately from files 130 instead of being a part of files 130.

System 100, in various embodiments, implements a platform service (e.g., a customer relationship management (CRM) platform service) that allows users of that service to develop, run, and manage applications. System 100 may be a multi-tenant system that provides various functionality to multiple users/tenants hosted by the multi-tenant system. Accordingly, system 100 may execute software routines from various, different users (e.g., providers and tenants of system 100) as well as provide code, web pages, and other data to users, databases, and other entities associated with system 100. As shown for example, system 100 includes database node 150 that can store and access data from files 130 of database 110 on behalf of users of system 100.

Database 110, in various embodiments, is a collection of information that is organized in a manner that allows for access, storage, and manipulation of that information. Accordingly, database 110 may include supporting software that allows for database node 150 to carry out operations (e.g., accessing, storing, etc.) on information that is stored at database 110. In some embodiments, database 110 is implemented by a single or multiple storage devices connected together on a network (e.g., a storage attached network (SAN)) and configured to redundantly store information to prevent data loss. The storage devices may store data persistently and thus database 110 may serve as a persistent storage. In various embodiments, database 110 is shared between multiple database nodes 150 such that database records written into files 130 by one database node 150 are accessible by other database nodes 150. Files 130 may be stored as part of LSM tree 120, which is implemented at database 110 in the illustrated embodiment.

Log-structured merge-tree 120, in various embodiments, is a data structure storing files 130 in an organized manner that uses a level-based scheme. LSM tree 120 may comprise two high-level components: an in-memory buffer and an on-disk component. Database node 150, in various embodiments, initially writes database records into an in-memory buffer located at database node 150. As the buffer becomes full and/or at certain points in time, database node 150 may flush database records to database 110 (the on-disk component). As part of flushing database records, database node 150 may write the database records into a set of new files that are included in a "top" level of LSM tree 120.

In various embodiments, LSM tree 120 is organized such that its levels store differing amounts of files 130 in order to improve read performance. The differing amounts of files 130 in each level give LSM tree 120 the appearance of being a tree structure in which the top level stores the least amount of files 130 and each subsequent, lower level stores more files 130 than the previous level. In various embodiments, database node 150 periodically performs a merge operation in which records in files 130 of one level are merged or copied along with other files 130 in the next level down into new files 130 in that next level. In some embodiments, a merge operation considers more than two levels (i.e., the source level and the next level down) when merging. An example of a multi-level merge operation is discussed in more detail with respect to FIG. 4.

Files 130, in various embodiments, are sets of database records. A database record may be a key-value pair comprising data and a corresponding database key that is usable to look up that database record. For example, a database record may correspond to a data row in a database table where the database record specifies values for one or more attributes associated with the database table. In various embodiments, a file 130 is associated with one or more database key ranges defined by the keys of the database records that are included in that file 130. Consider an example in which a file 130 stores three database records associated with keys "AA," "AAB," and "AC," respectively. Those three keys span a database key range of AA→AC and thus that file 130 may be associated with a database key range of AA→AC. As illustrated, files 130 can also include database key structures 140.

Figure 3:
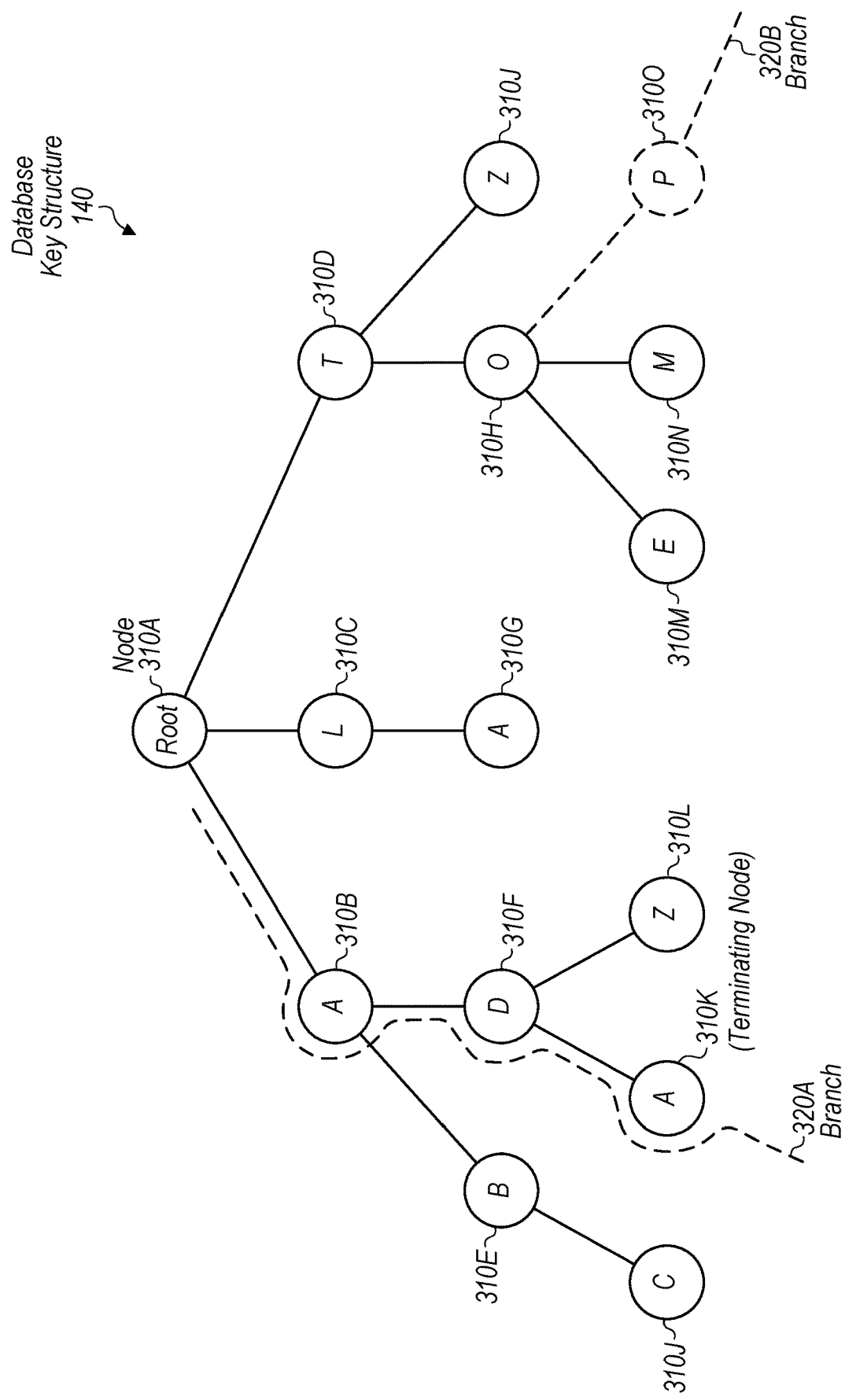
FIG. 3 is a block diagram illustrating example elements of a database key structure that stores database keys, according to some embodiments.

Database key structures 140, in various embodiments, store information that is usable to identify the keys and key ranges of files 130. In some embodiments, a database key structure 140 is a trie, which is a tree-like data structure whose branches are made of linked nodes that correspond to character values. Accordingly, a branch of a trie may represent a database key where the individual nodes of the branch correspond to the individual characters of the database key. A trie may be a probabilistic data structure that can provide an indication of the database key ranges associated with one or more files 130. As used herein, the term "probabilistic data structure" refers to a data structure that maintains information indicating that a particular item either does not exist or might exist at a particular location within a system. As an example, a probabilistic data structure can store information that indicates that a database record does not exist or might exist within a file 130. An example of a database key structure 140 as a trie is shown in FIG. 3.

Database node 150, in various embodiments, is hardware, software, or a combination thereof capable of providing database services, such as data storage, data retrieval, and/or data manipulation. Such database services may be provided to other components within system 100 and/or to components external to system 100. As an example, database node 150 may receive a database transaction request from an application server (not shown) that is requesting data to be written to or read from database 110. The database transaction request may specify an SQL SELECT command to select one or more rows from one or more database tables. The contents of a row may be defined in a database record and thus database node 150 may locate and return one or more database records that correspond to the selected one or more table rows. In some cases, the database transaction request may instruct database node 150 to write one or more database records for the LSM tree. As discussed, in various embodiments, database node 150 initially writes database records to an in-memory buffer before flushing those database records to database 110 as files 130 in a top level and merging those database records down the levels of LSM tree 120 over time.

Merge engine 160, in various embodiments, is a set of software routines executable to perform merge operations to merge database records from one or more levels of LSM tree 120 into a target/destination level of LSM tree 120. Merging records from one or more levels into a target level may include copying the records from one or more existing files 130 into a new file 130 in the target level. In various cases, an already existing file 130 in the target level may also contribute database records to the new file 130 in the same level. In various embodiments, a merge key range is used to determine which records from existing files 130 are to be merged into the new file 130 at the target level. Accordingly, merging records into the target level may include copying, into the target level, only the database records whose database key falls within the merge key range. As discussed in greater detail below, merge engine 160 may quantify the overlap of one or more files 130 with respect to the merge key range. The overlap of a file 130 with respect to the merge key range can be expressed as the number of database records of the file 130 whose database key falls within the merge key range. In various embodiments, merge engine 160 assigns a priority to a merge operation based on the overlap of files 130 (involved in the merge operation) with respect to the merge key range. Merge engine 160 may prioritize the performance of merge operations with higher priority over merge operations that have been assigned a lower priority.

Figure 2:
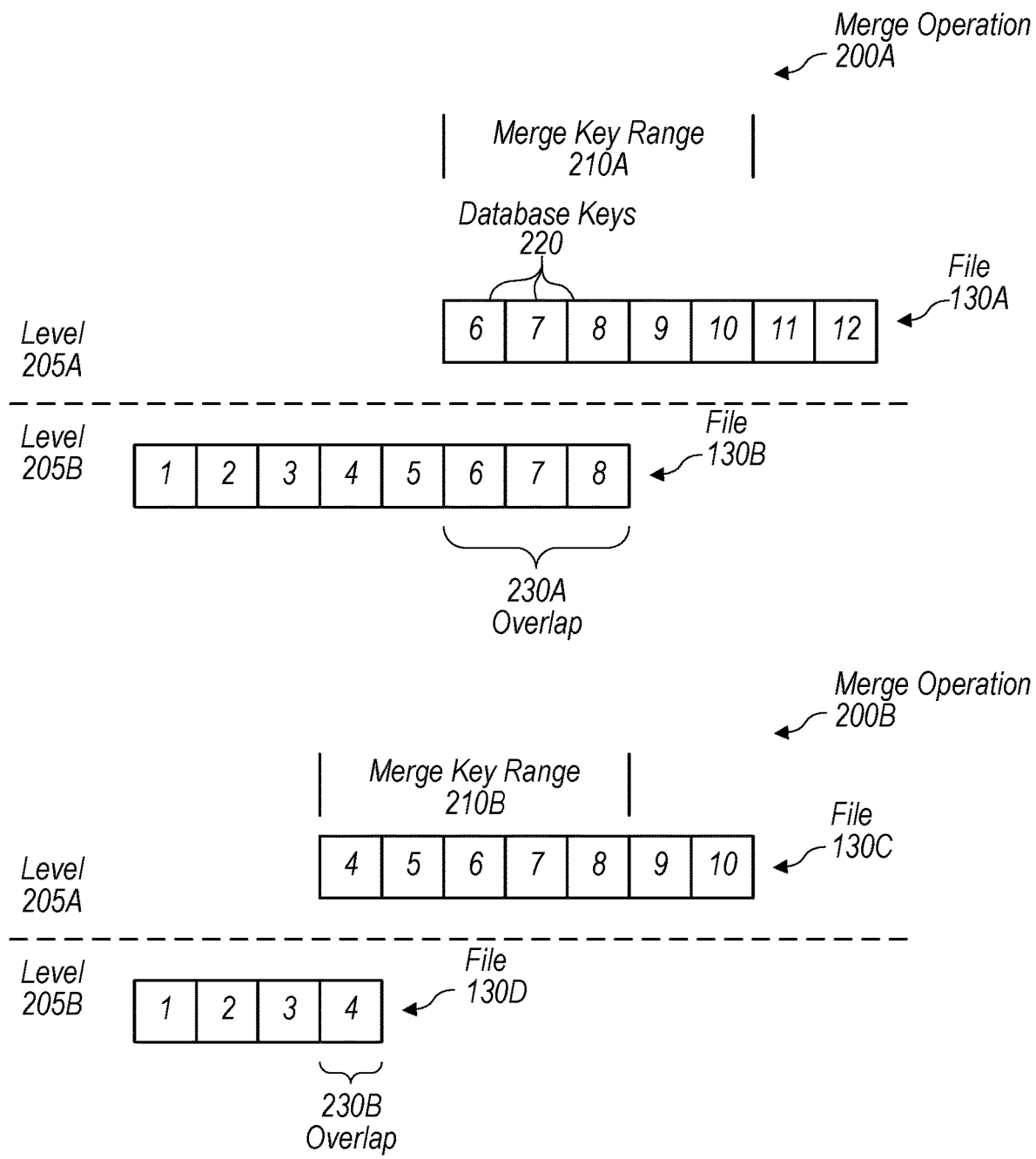
FIG. 2 is a block diagram illustrating example elements of merge operations, according to some embodiments.

Turning now to FIG. 2, a block diagram of example merge operations 200A and 200B are shown. In the illustrated embodiment, merge operation 200A involves a file 130A located in a level 205A and a file 130B located in a level 205B, and merge operation 200B involves a file 130C located in level 205A and a file 130D located in level 205B. As further shown, merge operation 200A involves a merge key range 210A and merge operation 200B involves a merge key range 210B. In some embodiments, merge operations 200A and 220B may be implemented differently than shown. For example, merge operation 200A may involve more than two levels 205 of LSM tree 120—an example of a multi-level merge operation 200 is discussed in more detail with respect to FIG. 4.

As mentioned, in various embodiments, LSM tree 120 is a tiered structure comprising multiple levels 205 in which each subsequent level 205 from the top level 205 stores more files 130 than the previous level 205. A level 205, in various embodiments, is a logical grouping of files 130 that are stored at a particular location. In some cases, a first level 205 may correspond to a different storage device than a second level 205. For example, level 205A may correspond to a solid state drive (SSD) while level 205B may correspond to a hard disk drive (HDD). Over time, database records may be moved to slower storage devices and thus may be merged down levels 205 of LSM tree 120 (e.g., from level 205A to level 205B).

Merge key range 210, in various embodiments, is a key range that defines the scope of database keys 220 that are considered for a corresponding merge operation 200. As shown for example, merge key range 210A spans from a minimum database key 220 of "6" to a maximum database key 220 of "10". In some cases, database records whose database keys 220 are equal in value to the boundaries of merge key range 210 are considered for a merge while, in other cases, those boundary database records are not considered for the merge. Merge key range 210 may be determined/defined in different ways. In some embodiments, merge key range 210 is defined such that it corresponds to the entire key range of a file 130. For example, merge key range 210 may be set to match the key range of file 130A and thus it will have a key range of 6→12. In some embodiments, merge key range 210 spans a set of amount of keys 220 and may rotate through the entire key range of a level 205. For example, a first merge operation 200 for a level 205 may have a key range 210 that spans keys 220 A→K and a second merge operation 200 for that same level 205 may have a key range 210 that spans keys 220 L→P, etc. In some embodiments, merge key range 210 is specified by a user of system 100.

As shown, merge operation 200A is a merge involving file 130A of level 205A and file 130B of level 205B. Before determining to perform merge operation 200A, database node 150 may determine a priority for merge operation 200A. In order to determine a priority, in various embodiments, database node 150 determines an overlap of ones of the set of files 130 involved in merge operation 200A with respect to merge key range 210A. As shown, for file 130B, an overlap 230A is determined that indicates that file 130B includes three keys 220 within merge key range 210A—this is indicative that file 130B may contribute at least three database records to merge operation 200A. File 130A includes five keys 220 within merge key range 210A and may contribute at least five database records to merge operation 200A. As such, database node 150 may determine that at least eight database records are involved in merge operation 200A and that there is a reasonable balance between the database record contributions from both files 130A and 130B. Based on either or both points (i.e., total records and contribution balance), database node 150 may assign a higher priority level to merge operation 200A than merge operation 200B as discussed below.

As shown, merge operation 200B is a merge involving file 130C of level 205A and file 130D of level 205B. Database node 150 may determine an overlap 230B that indicates that file 130D includes one key 220 within merge key range 210B. Database node 150 may determine that file 130A includes five keys 220 within merge key range 210B and thus a total of at least six database records may be involved in merge operation 200B. Since file 130D is in the target level and contributes reasonably less database records compared to file 130C, merge operation 200B is considered an input-dominated merge operation 200. Consequently, based on merge operation 200B being input-dominated and involving less records than merge operation 200A, in various embodiments, database node 150 assigns a lower priority to merge operation 200B than merge operation 200A. As a result, database node 150 may perform merge operation 200A (and other higher priority merge operations 200) before merge operation 200B. As discussed below, in various embodiments, database node 150 utilizes the database key structure 140 of a file 130 to determine that file's overlap 230 with a merge key range 210.

Turning now to FIG. 3, a block diagram of an example database key structure 140 is shown. In the illustrated embodiment, database key structure 140 is a trie that comprises nodes 310A-N that are linked together to form a tree-like structure having branches 320. As depicted for example, nodes 310A, 310B, 310F, and 310K are linked together to create a unique branch 320A. As used herein, the term "unique branch" refers a branch having a set of nodes that form a link from the root node 310 to a terminating node 310 (e.g., node 310K, node 310L, and node 310G) that does not have any children nodes 310—a child node 310 being a node that descends from another node within the tree-like structure. Two or more unique branches 320 can share a common portion. For example, branch 320A and a branch 320 defined by nodes 310A, 310B, 310F, and 310L share linked nodes 310A, 310B, and 310F in common. In some embodiments, database key structure 140 may be implemented differently than shown. For example, database key structure 140 may be an array of database keys 220 instead of a trie.

In order to determine the key range overlap 230 of a file 130 with respect to a merge key range 210, in various embodiments, database node 150 determines the number of unique branches 320 (of the file's database key structure 140) whose representative database key 220 falls within the merge key range 210. Consider an example in which a merge key range 210 of ADA→TOP is used for a merge operation 200. (This is illustrated by branches 320A and 320B with dashed lines. Node 3100 is shown to illustrate branch 320B, but node 3100 is not a part of the illustrated database key structure 140.) Database node 150 may traverse various nodes 310 of database key structure 140 to identify those unique branches 320 whose representative database key 220 falls within ADA→TOP. As depicted, five unique branches 320 falls within ADA→TOP: one branch 320 whose representative database key 220 is "ADA", another branch 320 whose representative key 220 is "ADZ," another branch 320 whose representative key 220 is "LA," another branch 320 whose representative key 220 is "TOE," and another branch 320 whose representative key 220 is "TOM." Consequently, database node 150 determines that the file 130 corresponding to the illustrated database key structure 140 shares an overlap 230 of five keys 220 with respect to the merge key range 210 of ADA→TOP.

In some embodiments, database key structures 140 are used in key range lookups/scans to identify files 130 that have database records whose database keys 220 fall within the lookup key range. In particular, database node 150 may receive a request for database records whose database key 220 falls within a particular lookup key range. Since such database records may be included in files 130 that are a part of different levels 205 of LSM tree 120, database node 150 may search a portion or all of levels 205 of LSM tree 120. Instead of first fetching a file 130 to check it for database records within the particular lookup key range, database node 150 may fetch the associated database key structure 140. Database node 150 may then determine if any unique branches 320 fall within the particular lookup key range. If there exist unique branches 320 in the lookup key range, then database node 150 may fetch the file 130 and access the appropriate database records; otherwise, database node 150 may skip fetching the file 130 from database 110. In various embodiments, database key structures 140 have reasonably smaller memory footprints than the corresponding files 130. Consequently, database node 150 may more quickly and efficiently access database key structures 140 from database 110 than accessing the corresponding files 115. As a result, using a database key structure 140 to check for whether a certain database record may be included in a file 130 instead of directly accessing the file 130 to check for the database record can provide a substantial performance boost to system 100.

Figure 4:
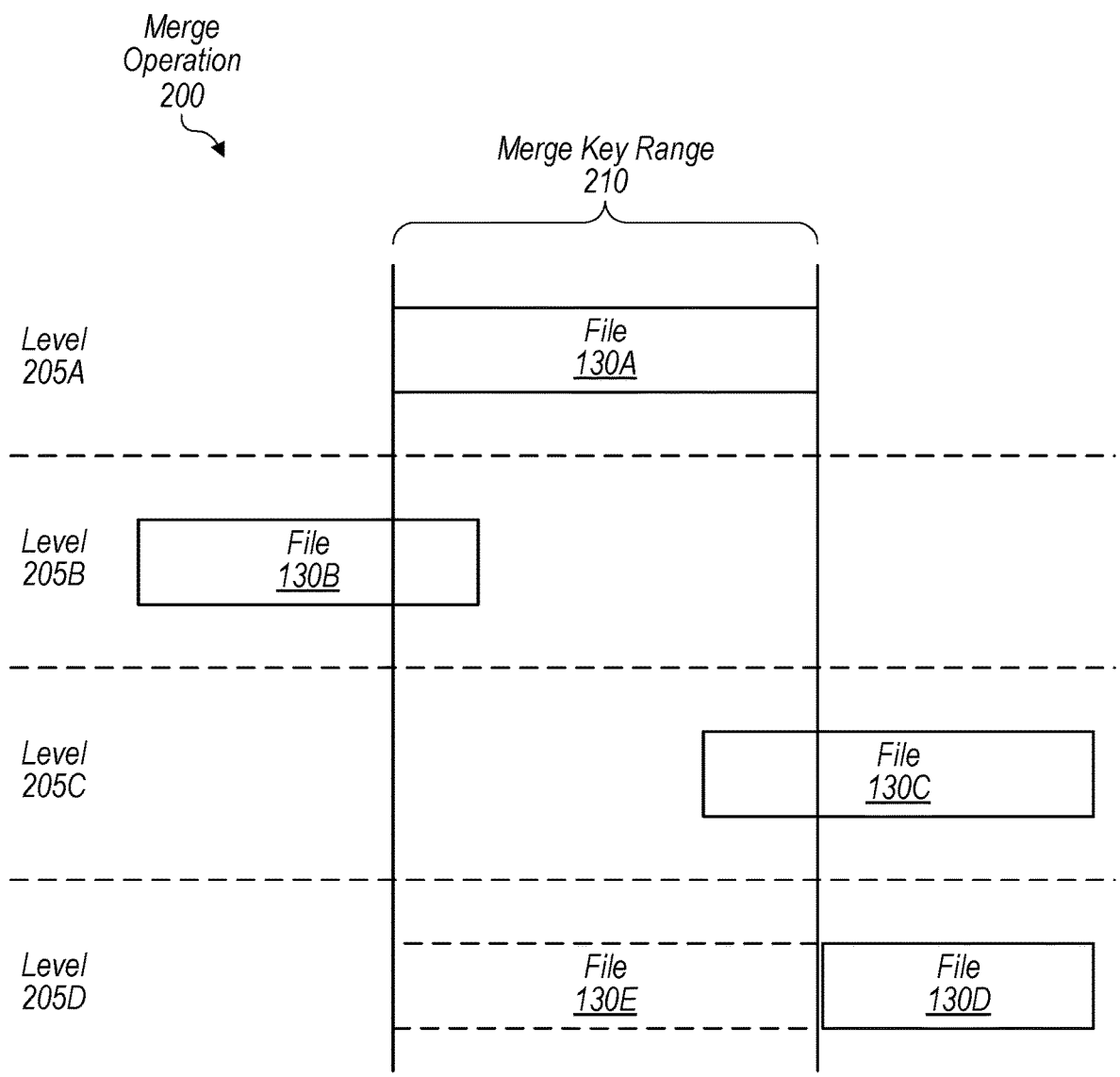
FIG. 4 is a block diagram illustrating example elements of a multi-level merge operation that involves more than two levels, according to some embodiments.

Turning now to FIG. 4, a block diagram of an example multi-level merge operation 200 is shown. In the illustrated embodiment, merge operation 200 involves files 130A, 130B, 130C, and 130D that are located in levels 205A, 205B, 205C, and 205D, respectively, of LSM tree 120. In some embodiments, merge operation 200 may be implemented differently than shown. For example, merge operation 200 may involve a level 205 that contributes multiple files 130 to a multi-level merge operation 200.

Instead of merging database records into the next level 205, in various cases, database node 150 may merge, in a single merge operation 200, database records into a target level 205 that is multiple levels 205 down in LSM tree 120. As illustrated for example, database records from level 205A are merged down three levels into target level 205D. The number of levels 205 involved in a multi-level merge operation 200 may be determined based on one or more of various criteria. In some embodiments, the number of levels 205 (and/or files 130 involved) is determined such that at least a threshold amount of data is merged into a file 130 at the target level 205. Consider the illustrated embodiment for example. Database node 150 may initially determine an overlap 230 of files 130A and 130B with respect to merge key range 210. Based on that overlap 230, database node 150 may determine an amount of data that will be written from those two files 130A and 130B into the new file 130. For example, database node 150 may determine, based on the overlap 230, that file 130A has an overlap of 20 database keys 220 and thus contributes at least 20 database records and file 130B has an overlap of only 4 database keys 220 and thus contributes at least 4 database records. In various cases, database node 150 may determine that writing 24 database records to the new file 130 consumes only half the available space of that file 130. Database node 150 may thus consider the next level (i.e., level 205C) and determine an overlap of file 130C with respect to merge key range 210. File 130C may contribute only 6 database records. As a result, there may be sufficient space remaining in the new file 130 to consider another level 205. Accordingly, database node 150 may then consider level 205D and determine an overlap of file 130D with respect to merge key range 210. In some cases, file 130D may contribute enough database records that database node 150 does not consider the next level 205. Thus, the merge operation 200 of this example involves four levels 205 of LSM tree 120 that contribute database records to file 130E.

In some embodiments, the number of levels 205 (and/or files 130) involved in a merge operation 200 is specified such that at least a specific number of levels 205 contribute database records. In some embodiments, the number of levels 205 is randomly selected. In some cases, database node 150 may skip levels 205 that do not include database records having keys 220 that fall within merge key range 210—these levels 205 may be excluded from the number of levels 205 count. In various embodiments, database node 150 can determine the overlap 230 of each level 205 with respect to merge key range 210 in parallel. That is, for each level 205, database node 150 may concurrently spawn a thread that calculates the overlap 230 of one or more files 130 in that level 205 with respect to merge key range 210.

Figure 5:
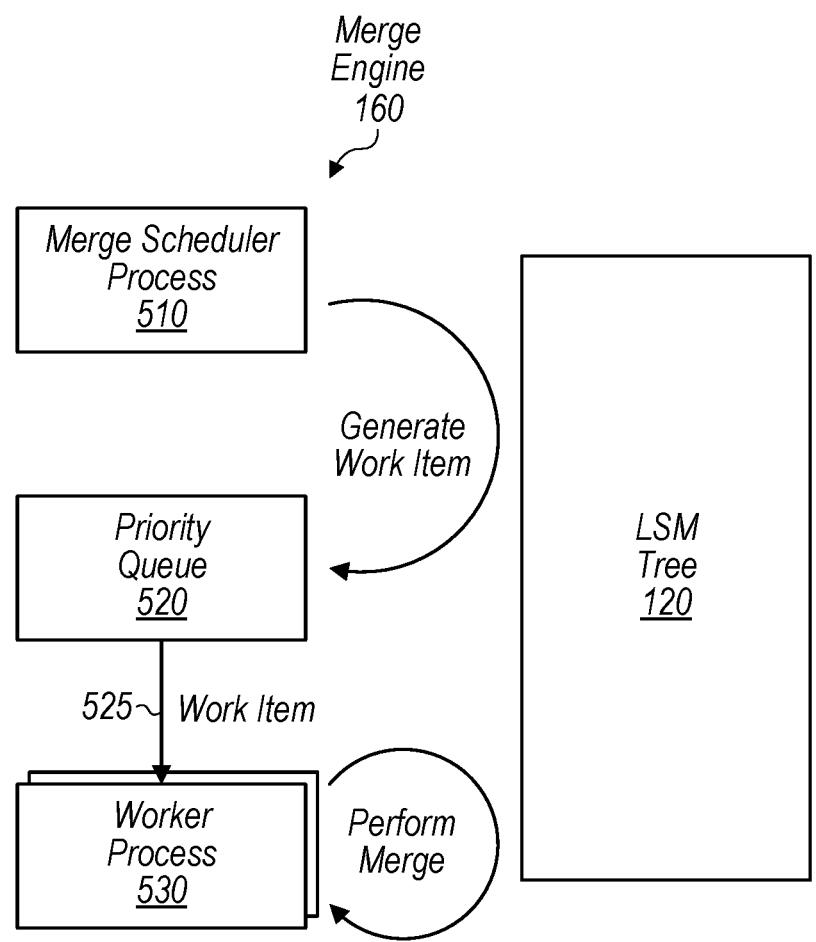
FIG. 5 is a block diagram illustrating example elements of a merge engine that is capable of performing merge operations, according to some embodiments.

Turning now to FIG. 5, a block diagram of an example merge engine 160 that interacts with LSM tree 120 is shown. In the illustrated embodiment, merge engine 160 includes a merge scheduler process 510, a priority queue 520, and worker processes 530. In some embodiments, merge engine 160 may be implemented differently than shown. As an example, merge engine 160 may include multiple merge scheduler processes 510 (e.g., one per level 205).

Merge scheduler process 510, in various embodiments, is a computer process capable of traversing LSM tree 120 and generating work items 525 to be processed to perform merge operations 200. For a given level 205 of LSM tree 120, in some embodiments, merge scheduler process 510 rotates through merge key ranges 210 for a portion or the entire key range of that level 205. For a given merge key range 210, merge scheduler process 510 may determine an amount of overlap of files 130 that are involved in the corresponding merge operation 200. In various embodiments, merge scheduler process 510 generates a merge work item 525 for that merge operation 200 and assigns a priority level to the work item 525 based on the determined amount of overlaps of those files 103 involved in the merge. Merge scheduler process 510 may then store the generated work item 525 in priority queue 520. Upon reaching the end of a key range for a level 205, merge scheduler process 510 may transition to the next level 205 down or restart from the key range of the current level 205. In some embodiments, multiple merge scheduler processes 510 are spawned—e.g., one per level 205, and the merge scheduler process 510 for a given level 205 continually rotates through a portion or the entire key range for that level 205 generating and storing work items 525 in priority queue 520.

Priority queue 520, in various embodiments, is a data structure that stores work items 525 in an order that is based on their corresponding assigned priority level. In various cases, a first work item 525 having a higher priority level than a second work item 525 may be stored such that the first work item 525 is retrieved from priority queue 520 before the second work item 525. As a result, work items 525 with higher priority levels may be processed before work items 525 with lower priority levels. In some embodiments, merge scheduler process 510 may reevaluate a merge operation 200 to create a work item 525 that replaces a previously created work item 525 for the same merge operation 200. The newer work item 525 may be associated with a higher priority level than the previously created work item 525 and thus may shift in the priority order maintained by priority queue 520. As an example, merge scheduler process 510 may initially determine an overlap of files 130 from various levels 205 with respect to a merge key range 210. Merge scheduler process 510 may create and store a work item 525 in priority queue 520 according to a priority level that is based on the overlap. Over time, LSM tree 120 changes and merge scheduler process 510 may reassess those various levels 205 to determine overlap with the merge key range 210. More database records may have been added and thus the overlap may be greater than when the initial assessment was performed. As a result, merge scheduler process 510 may create a new work item 525 with a higher priority level that replaces the previously stored work item 525. Accordingly, a merge operation 200 for a particular key range 210 may increase in priority level over time.

Worker processes 530, in various embodiments, are computer processes capable of retrieving work items 525 from priority queue 520 and performing the merge operations 200 that are identified by those retrieved work items 525. In some embodiments, multiple worker processes 530 may perform merge operations 200 that share levels 205 in common, but do not overlap in merge key ranges 210. A worker process 530 may further perform merge operations 200 for multiple different levels 205—the worker process 530 does not have to be assigned to a particular set of levels 205 such that the work process 530 performs only merge operations 200 associated with the particular set of levels 205. A worker process 530 may perform a merge operation 200 by copying, into a new file 130 in a target/destination level 205, database records from those files 130 associated with that merge operation 200. In some cases, database records of an involved file 130 that have keys 220 that fall outside of the merge key range 210 may be copied into the new file 130. In other cases, only those database records whose keys 220 fall within the merge key range 210 are copied into the new file 130.

Figure 6:
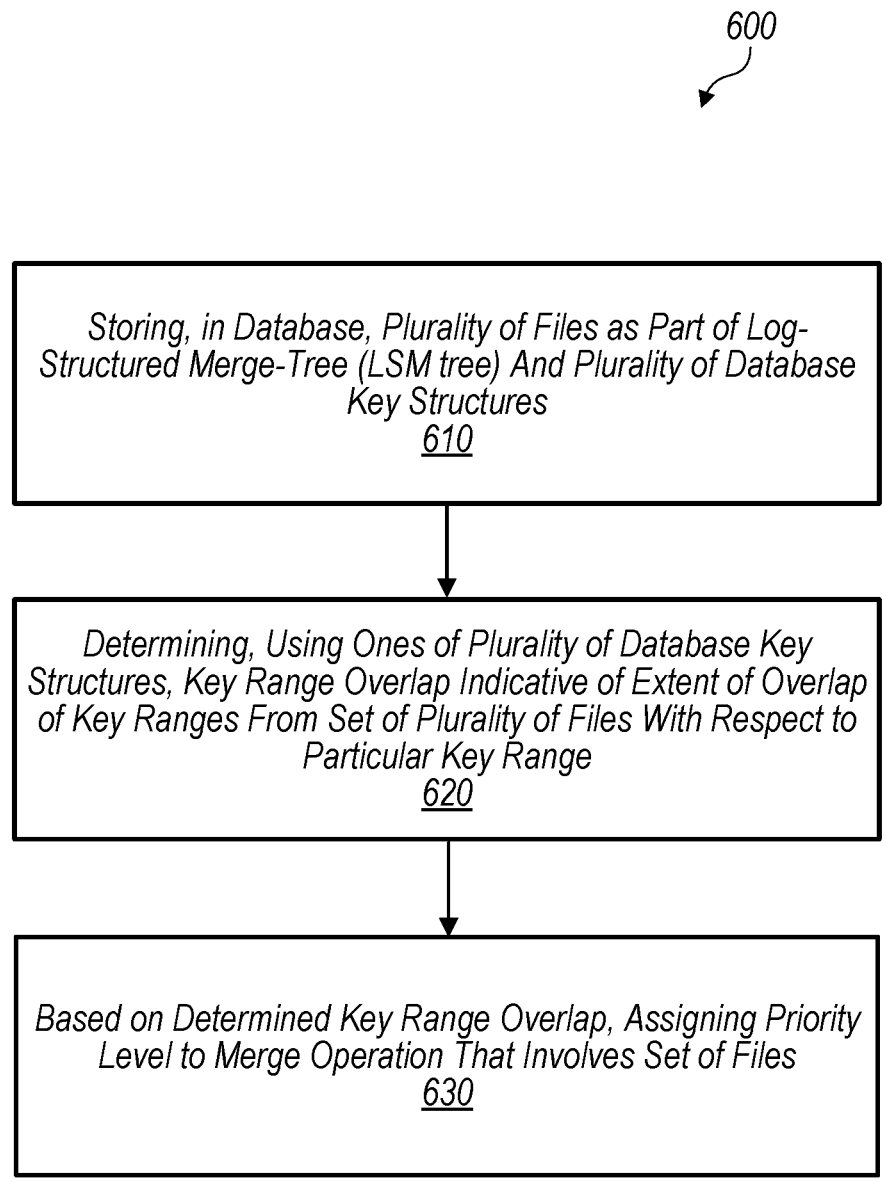
FIGS. 6 and 7 are flow diagrams illustrating example methods that relate to evaluating a merge operation, according to some embodiments.

Turning now to FIG. 6, a flow diagram of a method 600 is shown. Method 600 is one embodiment of a method performed by a computer system (e.g., system 100) to evaluate merge operations (e.g., merge operations 200) in order to prioritize the performance of certain merge operations over other ones. In some embodiments, method 600 may be performed by executing program instructions stored on a non-transitory computer-readable medium. Method 600 may include more or less steps than shown. For example, method 600 may include a step in which a merge operation is performed after being assigned a priority level.

Method 600 begins in step 610 with the computer system storing, in a database (e.g., a database 110), a plurality of files (e.g., files 130) as part of a log-structured merge-tree (e.g., an LSM tree 120) and a plurality of database key structures (e.g., database keys structures 140). A given one of the plurality of database key structures may indicate, for a corresponding one of the plurality of files, a set of key ranges derived from database records that are included in the corresponding file. In some cases, the given database key structure is a trie that includes a plurality of branches (e.g., branches 320). A given one of the plurality of branches may include a set of linked nodes (e.g., nodes 310) that correspond to a set of character values of a database key (e.g., key 220) associated with a particular database record included in the corresponding file.

In step 620, the computer system determines, using ones of the plurality of database key structures, a key range overlap (e.g., overlap 230) that is indicative of an extent of overlap of key ranges from a set of the plurality of files with respect to a particular key range (e.g., merge key range 210). Determining the extent of overlap of a key range from a particular one of the set of files with respect to the particular key range may include determining, for a database key structure corresponding to the particular file, a number of unique branches whose representative database key falls within the particular key range. In some cases, the particular key range may correspond to a key range of one of the set of files (e.g., a file 130 in the target level of the merge operation). A number of files in the set of files may be determined such that at least a threshold amount of data (e.g., 2 GB) is merged from the set of files into a file at a target level of the LSM tree. In various cases, ones of the set of files may be identified from at least three different levels of the LSM tree. In some cases, there may exist a level between two levels of the at least three different levels that does not contribute a file to the set of files.

In step 630, the based on the determined key range overlap, the computer system assigns a priority level to a merge operation that involves the set of files. In some embodiments, the computer system generates a work item (e.g., a work item 525) to be processed to perform the merge operation involving the set of files. The work item may be associated with the priority level assigned to the merge operation. In various embodiments, the computer system enqueues the work item in a priority queue (e.g., a priority queue 520) that orders work items according to priority level. The computer system may spawn a plurality of worker processes (e.g., worker processes 530) that are operable to retrieve work items from the priority queue and process the retrieved work items. In various cases, a first given one of the retrieved works items having a greater priority level than a priority level of a second given one of the retrieved work items may be processed before the second given work item. In some embodiments, at least two of the plurality of worker processes process concurrently respective work items involving merge operations that are associated with a same level of the LSM tree. That is, a worker process may not be responsible for merges of a specific level of the LSM tree, but can perform merges for multiple levels. The computer system may perform the merge operation by copying, into a file in a target level of the LSM tree, database records from the set of files.

Figure 7:
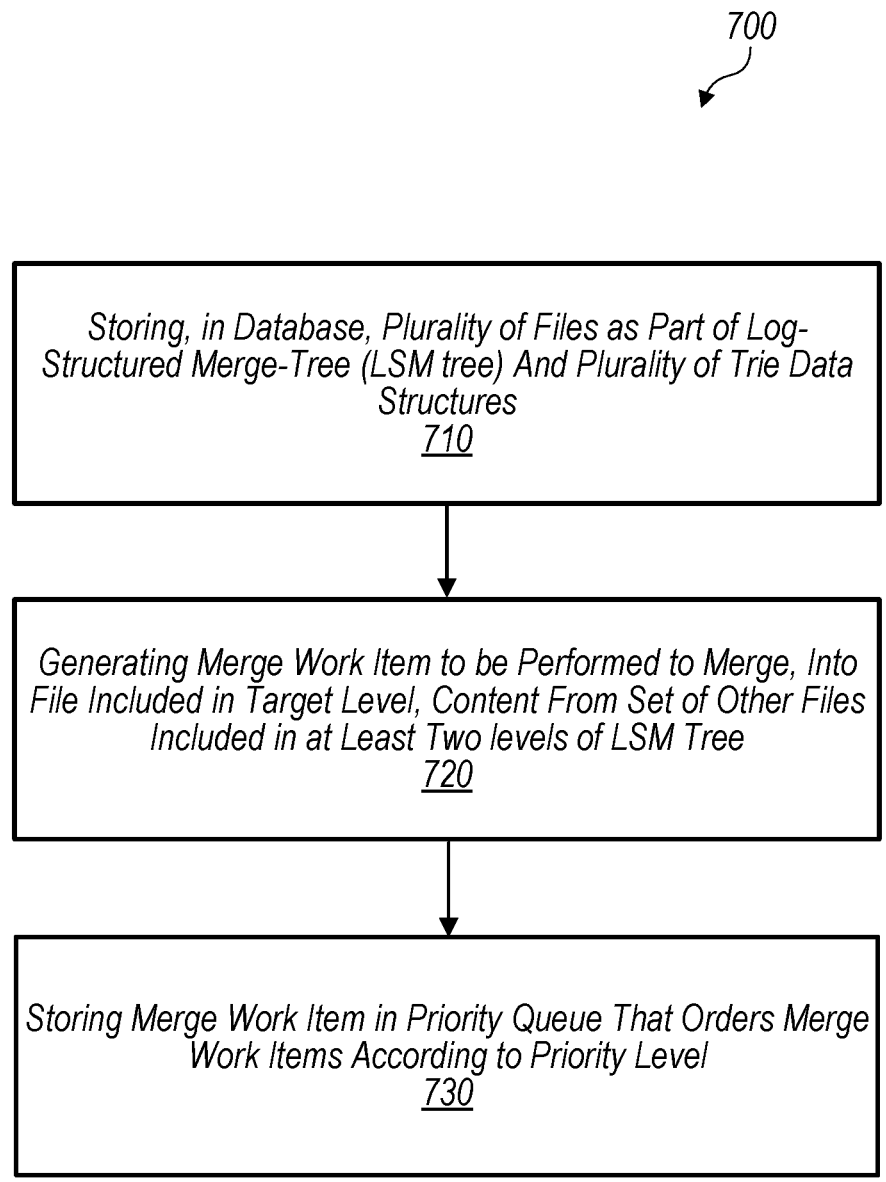

Turning now to FIG. 7, a flow diagram of a method 700 is shown. Method 700 is one embodiment of a method performed by a computer system (e.g., system 100) to evaluate merge operations (e.g., merge operations 200) in order to prioritize the performance of certain merge operations over other ones. In some embodiments, method 700 may be performed by executing program instructions stored on a non-transitory computer-readable medium. Method 600 may include more or less steps than shown. For example, method 700 may include a step in which a merge operation is performed after being assigned a priority level.

Method 700 begins in step 710 with the computer system storing, in a database (e.g., a database 110), a plurality of files (e.g., files 130) as part of a log-structured merge-tree (e.g., an LSM tree 120) and a plurality of trie data structures (e.g., database key structures 140). A given trie data structure may indicate, for a corresponding one of the plurality of files, a set of database keys (e.g., keys 220) that is associated with the corresponding file.

In step 720, the computer system generates a merge work item (e.g., a merge work item 525) to be performed to merge, into a file included in a target level, content from a set of other files included in at least two levels (e.g., levels 205) of the LSM tree. The merge work item may be assigned a priority level that is determined based on a key range overlap (e.g., an overlap 230) of the set of other files with respect to a particular key range (e.g., a merge key range 210). The key range overlap may be calculated using ones of the plurality of trie data structures. In various cases, the set of other files includes a first file and a second file and the particular key range corresponds to a key range of the first file. As such, the computer system may calculate the key range overlap by determining a number of database keys indicated in a trie data structure corresponding to the second file that fall within the key range of the first file.

In step 730, the computer system stores the merge work item in a priority queue (e.g., a priority queue 520) that orders merge work items according to priority level. The computer system may process a set of work items from the priority queue using a plurality of worker threads (e.g., worker processes 530). In some cases, a given worker thread may not be limited to performing merge operations involving a particular level of the LSM tree. The computer system, in some embodiments, performs a range key lookup for a second particular key range by identifying, based on the plurality of trie data structures, one or more files having database records whose database keys fall within the second particular key range.

Exemplary Multi-Tenant Database System

Figure 8:
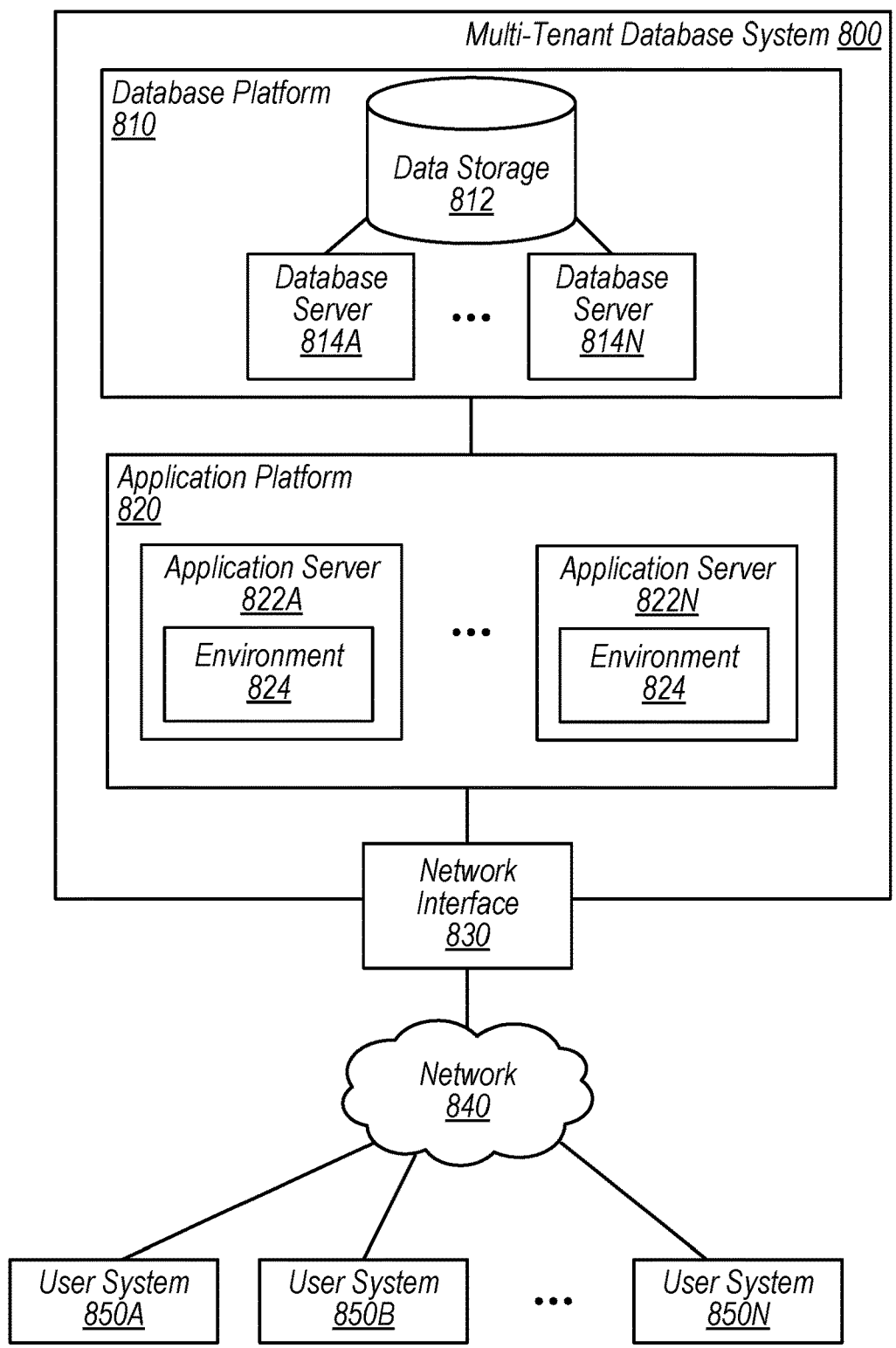
FIG. 8 is a block diagram illustrating elements of a multi-tenant system, according to some embodiments.

Turning now to FIG. 8, an exemplary multi-tenant database system (MTS) 800 in which various techniques of the present disclosure can be implemented is shown—e.g., system 100 may be MTS 800. In FIG. 8, MTS 800 includes a database platform 810, an application platform 820, and a network interface 830 connected to a network 840. Also as shown, database platform 810 includes a data storage 812 and a set of database servers 814A-N that interact with data storage 812, and application platform 820 includes a set of application servers 822A-N having respective environments 824. In the illustrated embodiment, MTS 800 is connected to various user systems 850A-N through network 840. The disclosed multi-tenant system is included for illustrative purposes and is not intended to limit the scope of the present disclosure. In other embodiments, techniques of this disclosure are implemented in non-multi-tenant environments such as client/server environments, cloud computing environments, clustered computers, etc.

MTS 800, in various embodiments, is a set of computer systems that together provide various services to users (alternatively referred to as "tenants") that interact with MTS 800. In some embodiments, MTS 800 implements a customer relationship management (CRM) system that provides mechanism for tenants (e.g., companies, government bodies, etc.) to manage their relationships and interactions with customers and potential customers. For example, MTS 800 might enable tenants to store customer contact information (e.g., a customer's website, email address, telephone number, and social media data), identify sales opportunities, record service issues, and manage marketing campaigns. Furthermore, MTS 800 may enable those tenants to identify how customers have been communicated with, what the customers have bought, when the customers last purchased items, and what the customers paid. To provide the services of a CRM system and/or other services, as shown, MTS 800 includes a database platform 810 and an application platform 820.

Database platform 810, in various embodiments, is a combination of hardware elements and software routines that implement database services for storing and managing data of MTS 800, including tenant data. As shown, database platform 810 includes data storage 812. Data storage 812, in various embodiments, includes a set of storage devices (e.g., solid state drives, hard disk drives, etc.) that are connected together on a network (e.g., a storage attached network (SAN)) and configured to redundantly store data to prevent data loss. In various embodiments, data storage 812 is used to implement a database (e.g., database 110) comprising a collection of information that is organized in a way that allows for access, storage, and manipulation of the information. Data storage 812 may implement a single database, a distributed database, a collection of distributed databases, a database with redundant online or offline backups or other redundancies, etc. As part of implementing the database, data storage 812 may store files (e.g., files 130) that include one or more database records having respective data payloads (e.g., values for fields of a database table) and metadata (e.g., a key value, timestamp, table identifier of the table associated with the record, tenant identifier of the tenant associated with the record, etc.).

In various embodiments, a database record may correspond to a row of a table. A table generally contains one or more data categories that are logically arranged as columns or fields in a viewable schema. Accordingly, each record of a table may contain an instance of data for each category defined by the fields. For example, a database may include a table that describes a customer with fields for basic contact information such as name, address, phone number, fax number, etc. A record therefore for that table may include a value for each of the fields (e.g., a name for the name field) in the table. Another table might describe a purchase order, including fields for information such as customer, product, sale price, date, etc. In various embodiments, standard entity tables are provided for use by all tenants, such as tables for account, contact, lead and opportunity data, each containing pre-defined fields. MTS 800 may store, in the same table, database records for one or more tenants—that is, tenants may share a table. Accordingly, database records, in various embodiments, include a tenant identifier that indicates the owner of a database record. As a result, the data of one tenant is kept secure and separate from that of other tenants so that one tenant does not have access to another tenant's data, unless such data is expressly shared.

In some embodiments, the data stored at data storage 812 is organized as part of a log-structured merge-tree (LSM tree—e.g., LSM tree 120). An LSM tree normally includes two high-level components: an in-memory buffer and a persistent storage. In operation, a database server 814 may initially write database records into a local in-memory buffer before later flushing those records to the persistent storage (e.g., data storage 812). As part of flushing database records, the database server 814 may write the database records into new files that are included in a "top" level of the LSM tree. Over time, the database records may be rewritten by database servers 814 into new files included in lower levels as the database records are moved down the levels of the LSM tree. In various implementations, as database records age and are moved down the LSM tree, they are moved to slower and slower storage devices (e.g., from a solid state drive to a hard disk drive) of data storage 812.

When a database server 814 wishes to access a database record for a particular key, the database server 814 may traverse the different levels of the LSM tree for files that potentially include a database record for that particular key. If the database server 814 determines that a file may include a relevant database record, the database server 814 may fetch the file from data storage 812 into a memory of the database server 814. The database server 814 may then check the fetched file for a database record having the particular key. In various embodiments, database records are immutable once written to data storage 812. Accordingly, if the database server 814 wishes to modify the value of a row of a table (which may be identified from the accessed database record), the database server 814 writes out a new database record to the top level of the LSM tree. Over time, that database record is merged down the levels of the LSM tree. Accordingly, the LSM tree may store various database records for a database key where the older database records for that key are located in lower levels of the LSM tree then newer database records.

Database servers 814, in various embodiments, are hardware elements, software routines, or a combination thereof capable of providing database services, such as data storage, data retrieval, and/or data manipulation. A database server 814 may correspond to database node 150. Such database services may be provided by database servers 814 to components (e.g., application servers 822) within MTS 800 and to components external to MTS 800. As an example, a database server 814 may receive a database transaction request from an application server 822 that is requesting data to be written to or read from data storage 812. The database transaction request may specify an SQL SELECT command to select one or more rows from one or more database tables. The contents of a row may be defined in a database record and thus database server 814 may locate and return one or more database records that correspond to the selected one or more table rows. In various cases, the database transaction request may instruct database server 814 to write one or more database records for the LSM tree—database servers 814 maintain the LSM tree implemented on database platform 810. In some embodiments, database servers 814 implement a relational database management system (RDMS) or object oriented database management system (OODBMS) that facilitates storage and retrieval of information against data storage 812. In various cases, database servers 814 may communicate with each other to facilitate the processing of transactions. For example, database server 814A may communicate with database server 814N to determine if database server 814N has written a database record into its in-memory buffer for a particular key.

Application platform 820, in various embodiments, is a combination of hardware elements and software routines that implement and execute CRM software applications as well as provide related data, code, forms, web pages and other information to and from user systems 850 and store related data, objects, web page content, and other tenant information via database platform 810. In order to facilitate these services, in various embodiments, application platform 820 communicates with database platform 810 to store, access, and manipulate data. In some instances, application platform 820 may communicate with database platform 810 via different network connections. For example, one application server 822 may be coupled via a local area network and another application server 822 may be coupled via a direct network link. Transfer Control Protocol and Internet Protocol (TCP/IP) are exemplary protocols for communicating between application platform 820 and database platform 810, however, it will be apparent to those skilled in the art that other transport protocols may be used depending on the network interconnect used.

Application servers 822, in various embodiments, are hardware elements, software routines, or a combination thereof capable of providing services of application platform 820, including processing requests received from tenants of MTS 800. Application servers 822, in various embodiments, can spawn environments 824 that are usable for various purposes, such as providing functionality for developers to develop, execute, and manage applications (e.g., business logic). Data may be transferred into an environment 824 from another environment 824 and/or from database platform 810. In some cases, environments 824 cannot access data from other environments 824 unless such data is expressly shared. In some embodiments, multiple environments 824 can be associated with a single tenant.

Application platform 820 may provide user systems 850 access to multiple, different hosted (standard and/or custom) applications, including a CRM application and/or applications developed by tenants. In various embodiments, application platform 820 may manage creation of the applications, testing of the applications, storage of the applications into database objects at data storage 812, execution of the applications in an environment 824 (e.g., a virtual machine of a process space), or any combination thereof. In some embodiments, application platform 820 may add and remove application servers 822 from a server pool at any time for any reason, there may be no server affinity for a user and/or organization to a specific application server 822. In some embodiments, an interface system (not shown) implementing a load balancing function (e.g., an F5 Big-IP load balancer) is located between the application servers 822 and the user systems 850 and is configured to distribute requests to the application servers 822. In some embodiments, the load balancer uses a least connections algorithm to route user requests to the application servers 822. Other examples of load balancing algorithms, such as are round robin and observed response time, also can be used. For example, in certain embodiments, three consecutive requests from the same user could hit three different servers 822, and three requests from different users could hit the same server 822.

In some embodiments, MTS 800 provides security mechanisms, such as encryption, to keep each tenant's data separate unless the data is shared. If more than one server 814 or 822 is used, they may be located in close proximity to one another (e.g., in a server farm located in a single building or campus), or they may be distributed at locations remote from one another (e.g., one or more servers 814 located in city A and one or more servers 822 located in city B). Accordingly, MTS 800 may include one or more logically and/or physically connected servers distributed locally or across one or more geographic locations.

One or more users (e.g., via user systems 850) may interact with MTS 800 via network 840. User system 850 may correspond to, for example, a tenant of MTS 800, a provider (e.g., an administrator) of MTS 800, or a third party. Each user system 850 may be a desktop personal computer, workstation, laptop, PDA, cell phone, or any Wireless Access Protocol (WAP) enabled device or any other computing device capable of interfacing directly or indirectly to the Internet or other network connection. User system 850 may include dedicated hardware configured to interface with MTS 800 over network 840. User system 850 may execute a graphical user interface (GUI) corresponding to MTS 800, an HTTP client (e.g., a browsing program, such as Microsoft's Internet Explorer™ browser, Netscape's Navigator™ browser, Opera's browser, or a WAP-enabled browser in the case of a cell phone, PDA or other wireless device, or the like), or both, allowing a user (e.g., subscriber of a CRM system) of user system 850 to access, process, and view information and pages available to it from MTS 800 over network 840. Each user system 850 may include one or more user interface devices, such as a keyboard, a mouse, touch screen, pen or the like, for interacting with a graphical user interface (GUI) provided by the browser on a display monitor screen, LCD display, etc. in conjunction with pages, forms and other information provided by MTS 800 or other systems or servers. As discussed above, disclosed embodiments are suitable for use with the Internet, which refers to a specific global internetwork of networks. It should be understood, however, that other networks may be used instead of the Internet, such as an intranet, an extranet, a virtual private network (VPN), a non-TCP/IP based network, any LAN or WAN or the like.

Because the users of user systems 850 may be users in differing capacities, the capacity of a particular user system 850 might be determined one or more permission levels associated with the current user. For example, when a salesperson is using a particular user system 850 to interact with MTS 800, that user system 850 may have capacities (e.g., user privileges) allotted to that salesperson. But when an administrator is using the same user system 850 to interact with MTS 800, the user system 850 may have capacities (e.g., administrative privileges) allotted to that administrator. In systems with a hierarchical role model, users at one permission level may have access to applications, data, and database information accessible by a lower permission level user, but may not have access to certain applications, database information, and data accessible by a user at a higher permission level. Thus, different users may have different capabilities with regard to accessing and modifying application and database information, depending on a user's security or permission level. There may also be some data structures managed by MTS 800 that are allocated at the tenant level while other data structures are managed at the user level.

In some embodiments, a user system 850 and its components are configurable using applications, such as a browser, that include computer code executable on one or more processing elements. Similarly, in some embodiments, MTS 800 (and additional instances of MTSs, where more than one is present) and their components are operator configurable using application(s) that include computer code executable on processing elements. Thus, various operations described herein may be performed by executing program instructions stored on a non-transitory computer-readable medium and executed by processing elements. The program instructions may be stored on a non-volatile medium such as a hard disk, or may be stored in any other volatile or non-volatile memory medium or device as is well known, such as a ROM or RAM, or provided on any media capable of staring program code, such as a compact disk (CD) medium, digital versatile disk (DVD) medium, a floppy disk, and the like. Additionally, the entire program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the disclosed embodiments can be implemented in any programming language that can be executed on a server or server system such as, for example, in C, C+, HTML, Java, JavaScript, or any other scripting language, such as VB Script.

Network 840 may be a LAN (local area network), WAN (wide area network), wireless network, point-to-point network, star network, token ring network, hub network, or any other appropriate configuration. The global internetwork of networks, often referred to as the "Internet" with a capital "I," is one example of a TCP/IP (Transfer Control Protocol and Internet Protocol) network. It should be understood, however, that the disclosed embodiments may utilize any of various other types of networks.

User systems 850 may communicate with MTS 800 using TCP/IP and, at a higher network level, use other common Internet protocols to communicate, such as HTTP, FTP, AFS, WAP, etc. For example, where HTTP is used, user system 850 might include an HTTP client commonly referred to as a "browser" for sending and receiving HTTP messages from an HTTP server at MTS 800. Such a server might be implemented as the sole network interface between MTS 800 and network 840, but other techniques might be used as well or instead. In some implementations, the interface between MTS 800 and network 840 includes load sharing functionality, such as round-robin HTTP request distributors to balance loads and distribute incoming HTTP requests evenly over a plurality of servers.

In various embodiments, user systems 850 communicate with application servers 822 to request and update system-level and tenant-level data from MTS 800 that may require one or more queries to data storage 812. In some embodiments, MTS 800 automatically generates one or more SQL statements (the SQL query) designed to access the desired information. In some cases, user systems 850 may generate requests having a specific format corresponding to at least a portion of MTS 800. As an example, user systems 850 may request to move data objects into a particular environment 224 using an object notation that describes an object relationship mapping (e.g., a JavaScript object notation mapping) of the specified plurality of objects.

Exemplary Computer System

Figure 9:
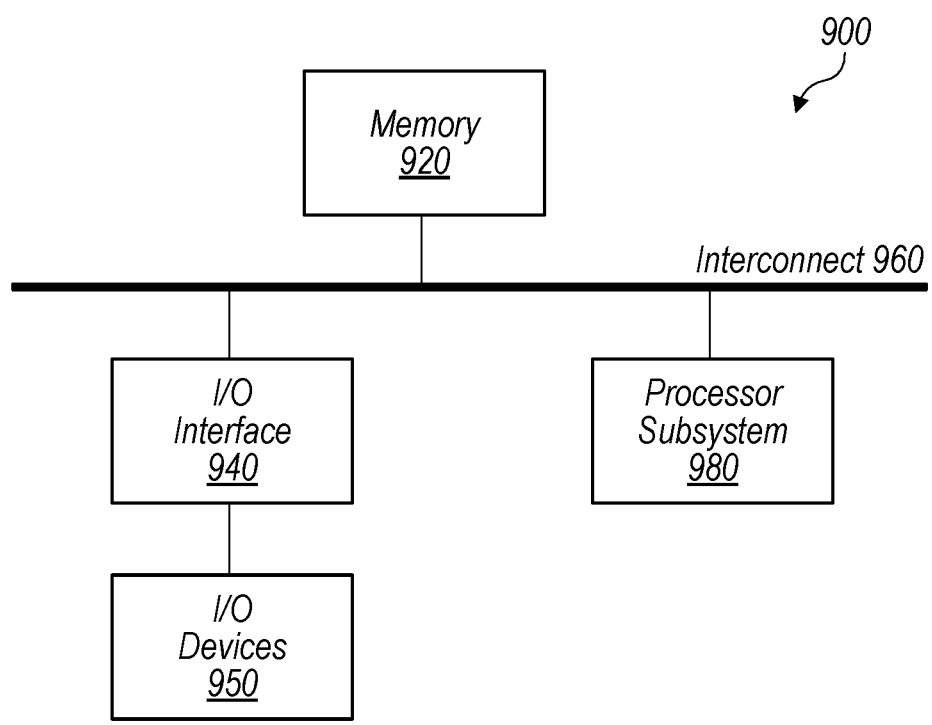
FIG. 9 is a block diagram illustrating elements of a computer system, according to some embodiments.

Turning now to FIG. 9, a block diagram of an exemplary computer system 900, which may implement system 100, database 110, database node 150, MTS 800, and/or user system 850, is depicted. Computer system 900 includes a processor subsystem 980 that is coupled to a system memory 920 and I/O interfaces(s) 940 via an interconnect 960 (e.g., a system bus). I/O interface(s) 940 is coupled to one or more I/O devices 950. Although a single computer system 900 is shown in FIG. 9 for convenience, system 900 may also be implemented as two or more computer systems operating together.

Processor subsystem 980 may include one or more processors or processing units. In various embodiments of computer system 900, multiple instances of processor subsystem 980 may be coupled to interconnect 960. In various embodiments, processor subsystem 980 (or each processor unit within 980) may contain a cache or other form of on-board memory.

System memory 920 is usable store program instructions executable by processor subsystem 980 to cause system 900 perform various operations described herein. System memory 920 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 900 is not limited to primary storage such as memory 920. Rather, computer system 900 may also include other forms of storage such as cache memory in processor subsystem 980 and secondary storage on I/O Devices 950 (e.g., a hard drive, storage array, etc.). In some embodiments, these other forms of storage may also store program instructions executable by processor subsystem 980. In some embodiments, program instructions that when executed implement merge engine 160 may be included/stored within system memory 920.

I/O interfaces 940 may be any of various types of interfaces configured to couple to and communicate with other devices, according to various embodiments. In one embodiment, I/O interface 940 is a bridge chip (e.g., Southbridge) from a front-side to one or more back-side buses. I/O interfaces 940 may be coupled to one or more I/O devices 950 via one or more corresponding buses or other interfaces. Examples of I/O devices 950 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 900 is coupled to a network via a network interface device 950 (e.g., configured to communicate over WiFi, Bluetooth, Ethernet, etc.).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
    storing, by a computer system, in a database:
        a plurality of files as part of a log-structured merge-tree (LSM tree); and
        a plurality of database key structures, wherein a given one of the plurality of database key structures indicates, for a corresponding one of the plurality of files, a set of key ranges derived from database records included in the corresponding file;
    determining, by the computer system using ones of the plurality of database key structures, a key range overlap that is indicative of an extent of overlap of key ranges from a set of the plurality of files with respect to a particular key range;
    based on the determined key range overlap, the computer system assigning a first priority level to a first merge operation that involves the set of files; and
    assigning, by the computer system, a second priority level to a second merge operation that involves a different set of files, wherein the key range overlap associated with the first merge operation involves more overlapping keys than a key range overlap that is associated with the second merge operation, and wherein the first priority level is a higher priority than the second priority level.

2. The method of claim 1, wherein the given database key structure is a trie that includes a plurality of branches, wherein a given one of the plurality of branches includes a set of linked nodes that correspond to a set of character values of a database key associated with a particular database record included in the corresponding file.

3. The method of claim 2, wherein determining the extent of overlap of a key range from a particular one of the set of files with respect to the particular key range includes:
    determining, for a database key structure corresponding to the particular file, a number of unique branches whose representative database key falls within the particular key range.

4. The method of claim 1, wherein a number of files in the set of files is determined such that at least a threshold amount of data is merged from the set of files into a file at a target level of the LSM tree.

5. The method of claim 4, wherein ones of the set of files are identified from at least three different levels of the LSM tree.

6. The method of claim 1, further comprising:
    generating, by the computer system, a work item to be processed to perform the first merge operation involving the set of files, wherein the work item is associated with the first priority level assigned to the first merge operation; and
    enqueueing, by the computer system, the work item in a priority queue that orders work items according to priority level.

7. The method of claim 6, further comprising:
    spawning, by the computer system, a plurality of worker processes operable to retrieve work items from the priority queue and process the retrieved work items, wherein a first given one of the retrieved works items having a greater priority level than a priority level of a second given one of the retrieved work items is processed before the second given work item.

8. The method of claim 7, wherein at least two of the plurality of worker processes process concurrently respective work items involving merge operations that are associated with a same level of the LSM tree.

9. The method of claim 1, wherein the particular key range corresponds to a key range of one of the set of files.

10. A non-transitory computer readable medium having program instructions stored thereon that are executable by a computer system to cause the computer system to perform operations comprising:
storing, in a database:
a plurality of files as part of a log-structured merge-tree (LSM tree); and
a plurality of database key structures, wherein a given one of the plurality of database key structures indicates, for a corresponding file, a set of database keys derived from database records included in the corresponding file;
determining, using ones of the plurality of database key structures, a key range overlap that is indicative of an extent of overlap of key ranges from a set of the plurality of files with respect to a particular key range; and
based on the determined key range overlap, assigning a first priority level to a first merge operation that involves the set of files; and
assigning a second priority level to a second merge operation that involves a different set of files, wherein the key range overlap associated with the first merge operation involves more overlapping keys than a key range overlap that is associated with the second merge operation, and wherein the first priority level is a higher priority than the second priority level.

11. The medium of claim 10, wherein determining the key range overlap includes:
identifying, for a particular one of the set of files, a number of database keys indicated by a corresponding database key structure that fall within the particular key range.

12. The medium of claim 10, wherein the operations further comprise:
performing the first merge operation, wherein the performing includes copying, into a file in a target level of the LSM tree, database records from the set of files, and wherein the set of files include files located in at least three different levels of the LSM tree.

13. The medium of claim 10, wherein a number of files in the set of files is determined such that at least a threshold number of levels of the LSM tree are involved in the first merge operation.

14. The medium of claim 10, wherein the operations further comprise:
determining, based on the first priority level, to delay performance of the first merge operation by performing at least one other merge operation before the first merge operation.

15. A method, comprising:
storing, by a computer system, in a database:
a plurality of files as part of a log-structured merge-tree (LSM tree); and
a plurality of trie data structures, wherein a given trie data structure indicates, for a corresponding one of the plurality of files, a set of database keys that is associated with the corresponding file;
generating, by the computer system, a first merge work item to be performed to merge, into a file included in a target level, content from a set of other files included in at least two levels of the LSM tree, wherein the first merge work item is assigned a first priority level that is determined based on a key range overlap of the set of other files with respect to a particular key range, and wherein the key range overlap calculated using ones of the plurality of trie data structures; and
storing, by the computer system, the first merge work item in a priority queue that orders merge work items according to priority level; and
assigning, by the computer system, a second priority level to a second merge work item that involves a different set of files, wherein the key range overlap associated with the first merge work item involves more overlapping keys than a key range overlap that is associated with the second merge work item, and wherein the first priority level is a higher priority than the second priority level.

16. The method of claim 15, wherein the set of other files includes a first file and a second file, wherein the particular key range corresponds to a key range of the first file, and wherein the method further comprises:
calculating, by the computer system, the key range overlap by determining a number of database keys indicated in a trie data structure corresponding to the second file that fall within the key range of the first file.

17. The method of claim 15, further comprising:
processing, by the computer system, a set of work items from the priority queue using a plurality of worker threads, wherein a given worker thread is not limited to performing merge operations involving a particular level of the LSM tree.

18. The method of claim 15, further comprising:
performing, by the computer system, a range key lookup for a second particular key range, wherein performing the range key lookup includes identifying, based on the plurality of trie data structures, one or more files having database records whose database keys fall within the second particular key range.

* * * * *